United States Patent
Li et al.

(10) Patent No.: US 6,233,357 B1
(45) Date of Patent: *May 15, 2001

(54) ARBITRARY SHAPE WAVELET TRANSFORM WITH PHASE ALIGNMENT

(75) Inventors: Jin Li, Vancouver; Shaw-Min Lei, Camas, both of WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/110,979

(22) Filed: Jul. 7, 1998

Related U.S. Application Data

(60) Provisional application No. 60/052,450, filed on Jul. 14, 1997.

(51) Int. Cl.[7] ............................................. G06K 9/36
(52) U.S. Cl. .................................... 382/248; 382/240
(58) Field of Search ............................... 382/232, 239, 382/240, 248; 364/724.011, 724.04, 724.05, 724.13, 724.14, 725.01, 725.02

(56) References Cited

U.S. PATENT DOCUMENTS

| | | | |
|---|---|---|---|
| 5,862,260 | * | 1/1999 | Rhoads .................................. 382/232 |
| 5,867,602 | * | 2/1999 | Zandi et al. .......................... 382/248 |
| 5,966,465 | * | 10/1999 | Keith et al. ............................ 382/232 |
| 5,999,656 | * | 12/1999 | Zandi et al. .......................... 382/248 |

FOREIGN PATENT DOCUMENTS 2 758 636    10/1998    (FR) .

OTHER PUBLICATIONS

Efficient Signal Extension for Subband/Wavelet Decomposition of Arbitrary Length Signals by H.J. Barnard, J.H. Weber and J. Biemond, Delft University of Technology, Dept. of Electrical Engineering, *966/SPIE* vol. 2094 (10 pp.)

Signal Extension and Noncausal Filtering for Subband Coding of Images by Stephen A. Martucci, School of Electrical Engineering, Georgia Institute of Technology, *SPIE vol. 1605 Visual Communications and Image Processing '91: Visual Communication*, pp. 137–148.

Discrete Cosine Transform on Irregular Shape for Image Coding by Mi Bi and Wai Kuen Cham of Dept. of Electrical Engineering, The Chinese University of Hong Kong and by Zhi Hang Zheng of Dept. of Electronic Engineering, Shanghai Jiao Tong University, published Oct. 19,1993, pp. 402–405.

Arbitrarily–Shaped Wavelet Packets for Zerotree Coding by Olivier Egger, Touradj Ebrahimi and Murat Kunt, Signal Processing Laboratory, Swiss Federal Institute of Technology at Lausanne, *0–7803–3192–3/96 IEEE*, published May 07, 1996, pp. 2335–2338.

(List continued on next page.)

*Primary Examiner*—Joseph Mancuso
*Assistant Examiner*—Ali Bayat
(74) *Attorney, Agent, or Firm*—Marger Johnson & McCollom, PC

(57) ABSTRACT

An arbitrary shape wavelet transform with phase alignment (ASWP) is used to transform an arbitrary shaped object in an image. The phase of an odd tap wavelet filter is aligned so that a low pass filter is always centered at an even index, and a high pass filter is always centered at an odd index. The phase of an even tap wavelet filter is aligned so that the low pass filter and the high pass filter are both centered at index 2i+0.5, i.e., a half index past the even index. The objects for odd tap wavelet filters are each separately symmetrically extended by mirroring the objects from the opposite ends but not mirroring the end pixels. The objects for the even tap filter is symmetrically extended by mirroring the pixels from the opposite ends of the objects including mirroring the end pixels. The phase adjusted-symmetrically extended objects are then transformed.

15 Claims, 12 Drawing Sheets

WAVELET DECOMPOSITION WITH SYMMETRICAL EXTENSION, (ODD TAP FILTER, PHASE 0)

OTHER PUBLICATIONS

Christopher M. Brislawn, "Preservation of Subband Symmetry in Multirate Signal Coding," *IEEE Transactions on Signal Processing*, vol. 43, No. 12, Dec. 1995, pp. 3046–3050.

Zhixiong Wu and Toshifumi Kanamaru, "Block–based DCT and wavelet selective coding for arbitrary–shaped images," *SPIE vol. 3024*, Jan. 1997. pp. 658–665.

Joo–Hee Moon, Gwang–Hoon Park, Sung–Moon Chun, and Seok–Rim Choi, "Shape–Adaptive Region Partitioning Method for Shape–Assisted Block–Based Texture Coding," *IEEE Transactions on Circuits and Systems for Video Technology*, vol. 7, No. 1, Feb. 1997, pp. 240–246.

Peter Kauff, Bela Makai, Stefan Rauthenberg, Ulrich Golz, Jan L. DeLameillieure, and Thomas Sikora, "Functional Coding of Video Using a Shape–Adaptive DCT Algorithm and an Object–Based Motion Prediction Toolbox," *IEEE Transactions on Circuits and Systems for Video Technology*, vol. 7, No. 1, Feb. 1997, pp. 181–196.

Hiroyuki Katata, Norio Ito, Tomoko Aono, and Hiroshi Kusao, "Object Wavelet Transform for Coding of Arbitrarily Shaped Image Segments," *IEEE Transactions on Circuits and Systems for Video Technology*, vol. 7, No. 1, Feb. 1997, pp. 234–237.

Shipeng Li, "Shape Adaptive Discrete Wavelet Transform for Coding Arbitrarily Shaped Texture," *SPIE vol. 3024*, Jan. 1997, pp. 1046–1056.

Jin Li and Shawmin Lei, "Improvements of core experiment T1: rate–distortion optimized embedding," ISO/IEC JTC1/SC29/WG11, MPEG97/M2035, Apr. 1997, Bristol, England, pp. 1–16.

* cited by examiner

WAVELET DECOMPOSITION WITH SYMMETRICAL EXTENSION, (ODD TAP FILTER, PHASE 1)

DUE TO THE SYMMETRY OF DATA AND FILTER, THE TWO ABOVE LOW PASS COEFFICIENTS ARE EXACTLY THE SAME.

FIG.3 WAVELET DECOMPOSITION WITH SYMMETRICAL EXTENSION, (EVEN TAP FILTER, PHASE 0)

FIG.4 WAVELET DECOMPOSITION WITH SYMMETRICAL EXTENSION, (EVEN TAP FILTER, PHASE 1)

FIG.6 1-0 ASWP TRANFORM FOR (a) ODD-TAP FILTER, (b) EVEN-TAP FILTER

| MASK IN SPACE DOMAIN | | TRANSFORMED MASK | |
|---|---|---|---|
| m(2i) | m(2i+1) | $m_L(i)$ | $m_H(i)$ |
| 0 | 0 | 0 | 0 |
| 0 | 1 | 0 | 1 |
| 1 | 0 | 1 | 0 |
| 1 | 1 | 1 | 1 |

TABLET 1 BINARY MASK TRANSFORM FOR ODD LENGTH SYMMETRIC FILTER

| MASK IN SPACE DOMAIN | | TRANSFORMED MASK | |
|---|---|---|---|
| m(2i) | m(2i+1) | $m_L(i)$ | $m_H(i)$ |
| 0 | 0 | 0 | 0 |
| 0 | 1 | 1 | 0 |
| 1 | 0 | 1 | 0 |
| 1 | 1 | 1 | 1 |

TABLET 2 BINARY MASK TRANSFORM FOR EVEN LENGTH SYMMETRIC FILTER

FIG. 10

FIG.11 2-D ARBITRARY SHAPE WAVELET TRANSFORM USING ODD TAP FILTER WITH (a)1-D HORIZONTAL DECOMPOSITION OF EACH ROW AND (b)1-D VERTICAL DECOMPOSITION OF EACH COLUMN

ARBITRARY SHAPE WAVELET TRANSFORM WITH PHASE ALIGNMENT

This application is a conversion of U.S. Provisional Application Serial No. 60/052,450 filed Jul. 14, 1997.

BACKGROUND OF THE INVENTION

The invention relates to wavelet transform of an arbitrary shape object and more particularly to an arbitrary shape wavelet transform with phase alignment (ASWP).

Compared with coding a whole rectangular image, coding of individual objects in a nonrectangular shape has numerous advantages in coding efficiency and functionality. Such coding requires coding of the shape mask and the content image. The binary shape mask can be encoded by modified modified READ or context adaptive arithmetic coding. The arbitrary shape content image is transformed into the transform domain, quantized and entropy encoded. Since the content image is not of a rectangular shape, regular DCT and wavelet transforms can not be applied directly.

There are a number of approaches for transforming an arbitrary shape content image. The most popular approach is padding which is described by Z. Wu and T. Kanamaru, "Block-based DCT and wavelet selective coding for arbitrarily shaped images", Visual Communication and Image Processing'97, SPIE Vol. 3024, pp. 658–665, January 1997, San Jose, Calif. With padding, the image is segmented into fixed size blocks. Only those blocks that contain at least one object pixel are encoded. For blocks that are not fully occupied by the object, the remaining pixels are padded repeatedly with nearby object pixels. Since padding increases the number of coefficients to be coded, coding efficiency is significantly decreased. An improved version of the padding approach is described by J. Moon, G. Park, S. Chun and S. Choi, "Shape-adaptive region partitioning method for shape-assisted block-based texture coding", IEEE Trans. on Circuits and Systems for Video Technology, vol. 7, no.1, pp.240–246, February 1997. In Moon et al., block positions are systematically changed to reduce the number of blocks that need to be coded and the number of coefficients that need to be padded.

A wavelet padding approach is described by H. Katata, N. Ito, T. Anno and H. Kusao, "Object wavelet transform for coding of arbitrarily shaped image segments", IEEE Trans. on Circuits and Systems for Video Technology, vol. 7, no. 1, pp.235–237, February 1997. In Katata, et. al., padding is restricted to a small region around the original object. Although these techniques reduce the number of coefficients to be padded, padding is still required.

A shape-adaptive (SA) DCT is described by P. Kauff, B. Makai, S. Rauthenberg, U. Golz, J. Lameillieure and T. Sikora, "Functional coding of video using a shape-adaptive DCT algorithm and an object-based motion prediction toolbox", IEEE Trans. on Circuits and systems and Video Technology, vol. 7, no. 1, pp.181–196, February 1997. The shape-adaptive (SA) DCT avoids padding in block based DCTs. To apply the DCT to a block not fully occupied by the object, SA-DCT first moves all pixels toward the upper block boundary. A variable basis DCT is applied independently to each column with the DCT basis equal to the number of coefficients in each column. After SA-DCT in the vertical direction, the pixels are moved toward the left block boundary, and a similar variable basis DCT with basis corresponding to the number of coefficients in each row are applied horizontally.

Although SA-DCT avoids padding, there are several disadvantages in terms of transform efficiency and implementation complexity. The variable basis DCT used in SA-DCT has no fast algorithms. It is also not separable and the result is different if the horizontal transform is applied first. Transform efficiency is reduced because the neighboring pixels in the horizontal transform might not be the neighboring pixels in the original image. A nonpadding shape adaptive wavelet transform is described by W. Li and S. Li, "Shape-adaptive discrete wavelet transform for coding arbitrarily type shaped texture", Visual Communication and Image Processing'97, SPIE Vol. 3024, pp. 1046–1056, January 1997, San Jose, Calif. Whenever the data length is longer than the wavelet filter, if the data length is even, the data is directly transformed with a circular wavelet transform, if the data length is odd, the data is truncated to the next even length and transformed again with the circular wavelet transform, the extra pixel is copied directly to the low pass band. A Haar transform is adopted whenever the wavelet filter length is longer than the data. This technique is complex as there are several modes of the transform. The transform efficiency is also reduced since the Haar transform adopted when the data length is short is not very efficient, and in a 2D transform, the subsequent vertical transform is not applied on the phase aligned horizontal transform coefficients.

Thus a need remains to improve the transform efficiency for encoding arbitrary shaped objects.

SUMMARY OF THE INVENTION

A 2-D arbitrary shape wavelet transform with phase alignment (ASWP) is used to transform an arbitrary shaped object in an image. The 2-D ASWP first 1-D ASWP transforms the object horizontally and then 1-D ASWP transforms the object vertically. The 1-D ASWP will first be discussed and then the 2-D ASWP. In 1-D ASWP, the phase of an odd tap wavelet filter is adjusted so that the center of the low and high pass filters are always aligned with an alternate odd and even index with regard to the original segments. The phase of an even tap wavelet filter is adjusted so that the low pass filter and the high pass filter are both centered in the middle of the odd and even index with regard to the original segments. The objects are then wavelet transformed using symmetrical extension.

1-D ASWP separately transform 1-D objects that each occupy pixels from index idx_st to index idx_end, with length len=idx_end-idx_st+1. The 1-D objects for odd tap wavelet filters are each symmetrically extended by mirroring the objects separately from the opposite ends but not mirroring the pixels at locations idx_st and idx_end. The objects for the even tap filter are symmetrically extended by mirroring the pixels from the opposite ends including mirroring the pixels at locations idx_st and idx_end. The phase of the filter is then adjusted according to the index with respect to the original segment, not the index with respect to the objects. The objects are then transformed by wavelet filtering with symmetrical extension.

The ASWP is different from other shape adaptive wavelet transforms in that the ASWP can handle objects of both even and odd length. Also, during a horizontal wavelet transform, the phase of the wavelet coefficients are aligned for further vertical decomposition. Unlike padding based wavelet transforms, ASWP does not require any padding, and the number of coefficients after performing the arbitrary shape wavelet transform is exactly the same as that in the space domain. The ASWP scheme is based on the symmetrical signal extensions already used with rectangular shaped wavelet transforms. Thus, ASWP can be implemented using current existing hardware. Because the ASWP is consistent in implementation with rectangular wavelet transforms, there is no implementation overhead.

The foregoing and other objectives, features and advantages of the invention will become more readily apparent from the following detailed description of a preferred embodiment of the invention, which proceeds with reference to the accompanying drawings.

BRIEF DESCRIPTION OF THE DRAWINGS

FIG. 10 shows tables for a binary mask transform for an odd length symmetric filter a binary mask transform for an even length symmetric filter.

DETAILED DESCRIPTION

Wavelet transform with symmetrical boundary extension

Figure 1:
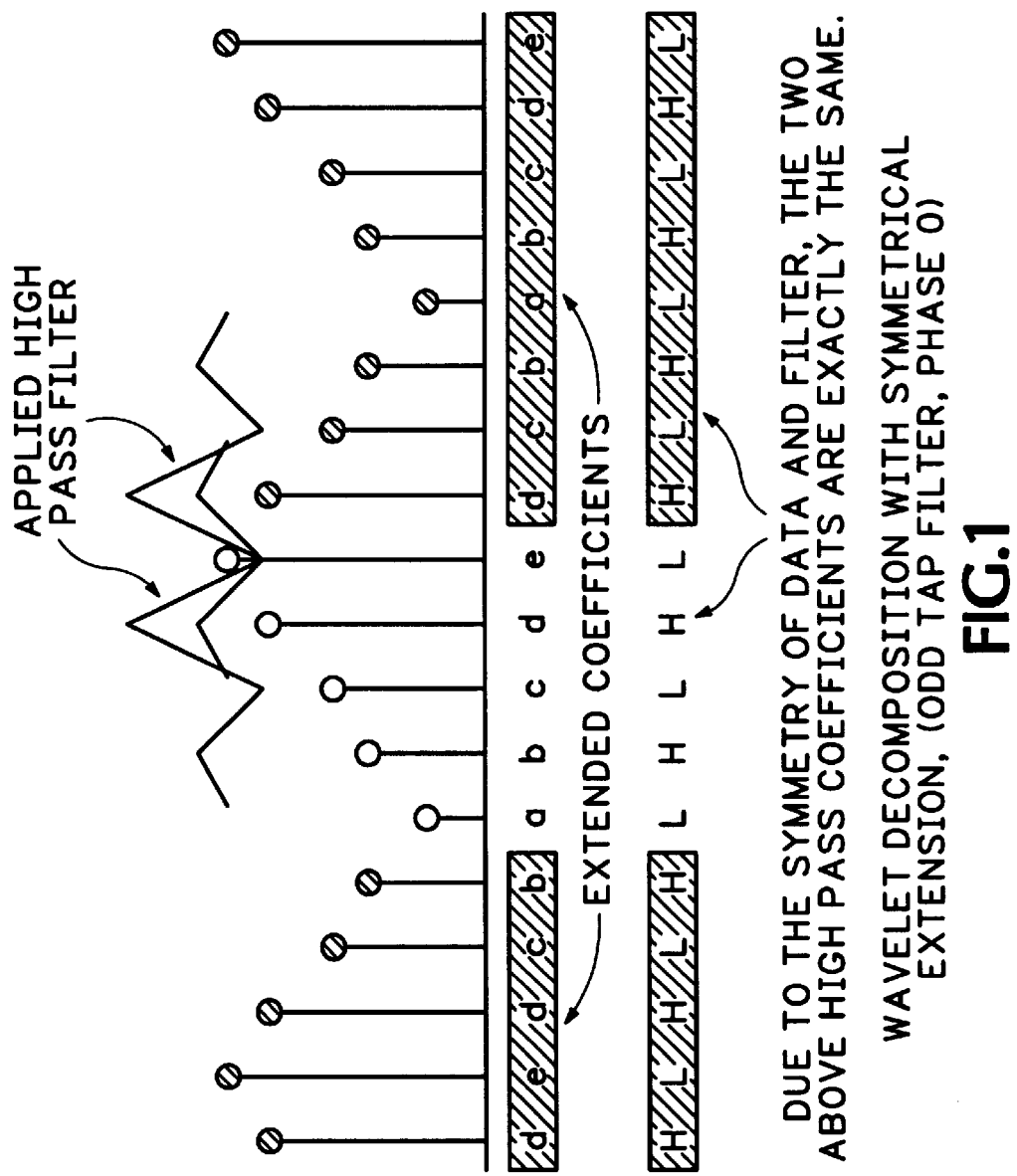
FIG. 1 is a graph showing wavelet decomposition with symmetrical extension for an odd tap phase 0 filter.
Figure 2:
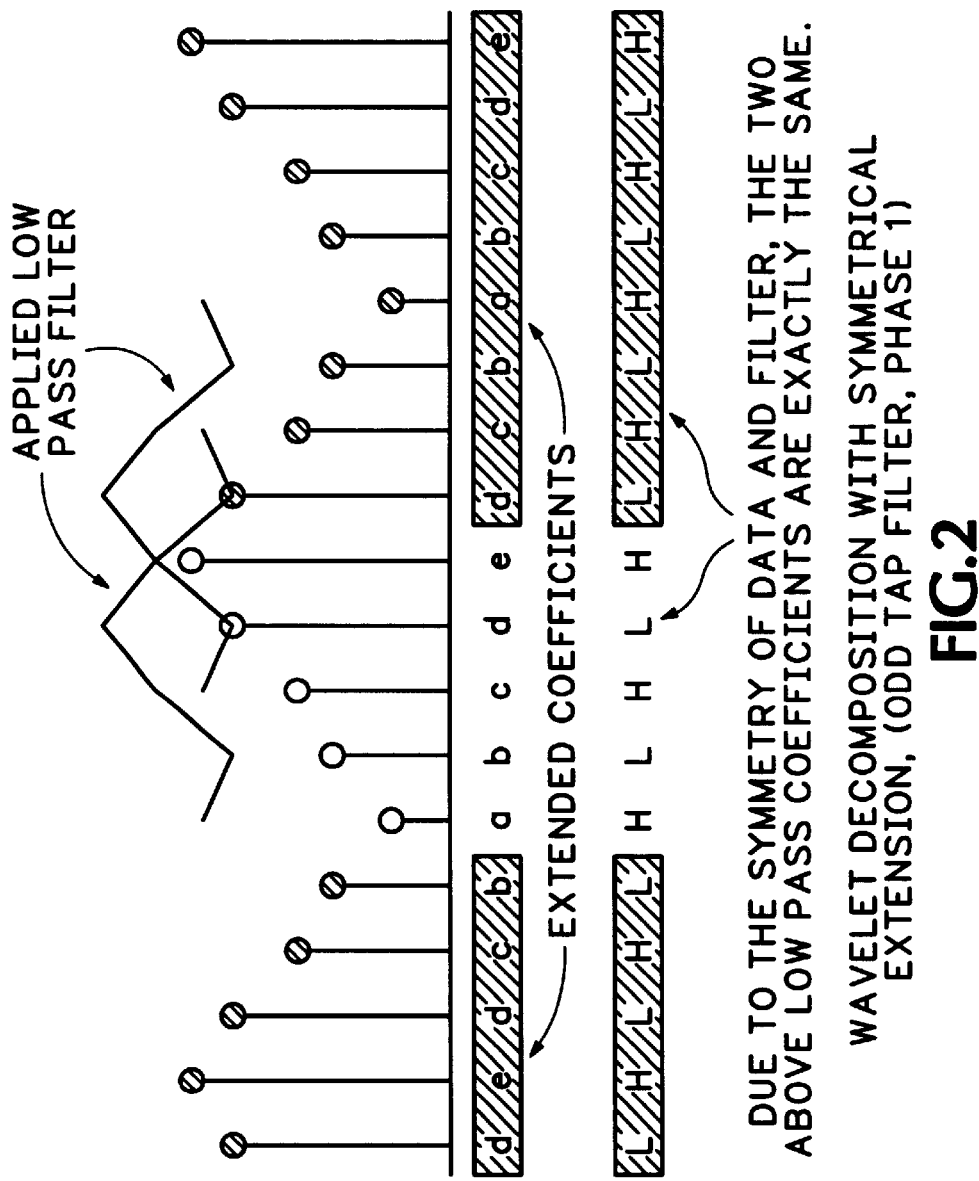
FIG. 2 is a graph showing wavelet decomposition with symmetrical extension for an odd tap phase 1 filter.

The theory of biorthogonal discrete wavelet transform indicates that a signal x(n) of limited energy can be decomposed and perfectly reconstructed by a pair of biorthogonal wavelength filters:

$$\text{Decomposition: } y(k) = \begin{cases} \sum_n l_f(k-n)x(n) & k \text{ is even (low pass)} \\ \sum_n h_f(k-n)x(n) & k \text{ is odd (high pass)}, \end{cases} \quad (1)$$

$$\text{Reconstruction: } \hat{x}(n) = \sum_{k=\text{even}} l_i(k-n)y(k) + \sum_{k=\text{odd}} h_i(k-n)y(k) \quad (2)$$

Where $l_f$ and $h_f$ are the decomposition low-pass and high-pass wavelet filter pair, $l_i$ and $h_i$ are the reconstruction low-pass and high-pass wavelet filter pair, respectively. The actual position of the filter operation depends on the parity of the tap of the filter. For an odd tap filter, the low and high pass filters are centered at alternate odd and even indices, as shown in FIG. 1 and FIG. 2. In equations 1 and 2, the low filter coefficient is applied at the even positions, and the high pass filter is applied at the odd positions. Nevertheless, the phase of the filter can be switched so that the low pass filter is applied at the odd positions, and the high pass filter applied at the even positions. The low pass coefficients can be separated from the high pass coefficients and denoted separately as:

$$\text{Low pass decomposition: } f(k) = y(2k) = \sum_n l_f(n - 2k)x(n) \quad (3)$$

$$\text{High pass decomposition: } g(k) = y(2k+1) = \sum_n h_f(n - 2k - 1)x(n) \quad (4)$$

Figure 3:
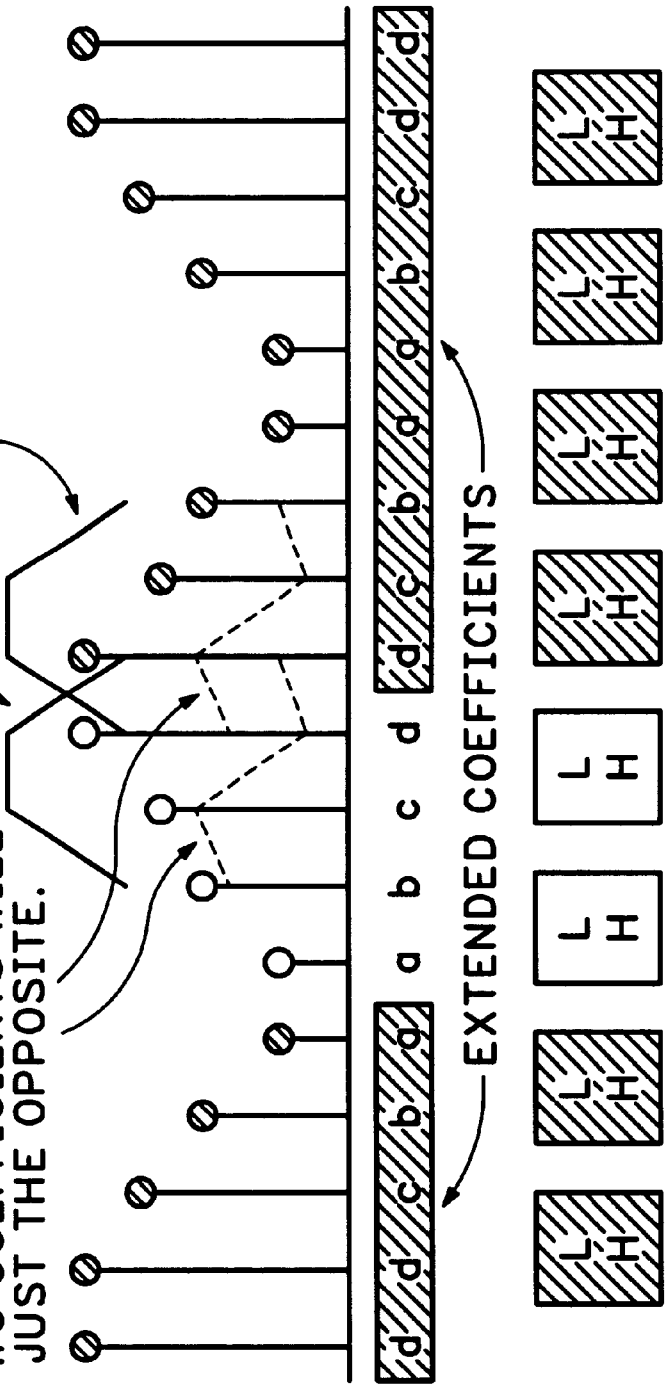
FIG. 3 is a graph showing wavelet decomposition with symmetrical extension for an even tap phase 0 filter.
Figure 4:
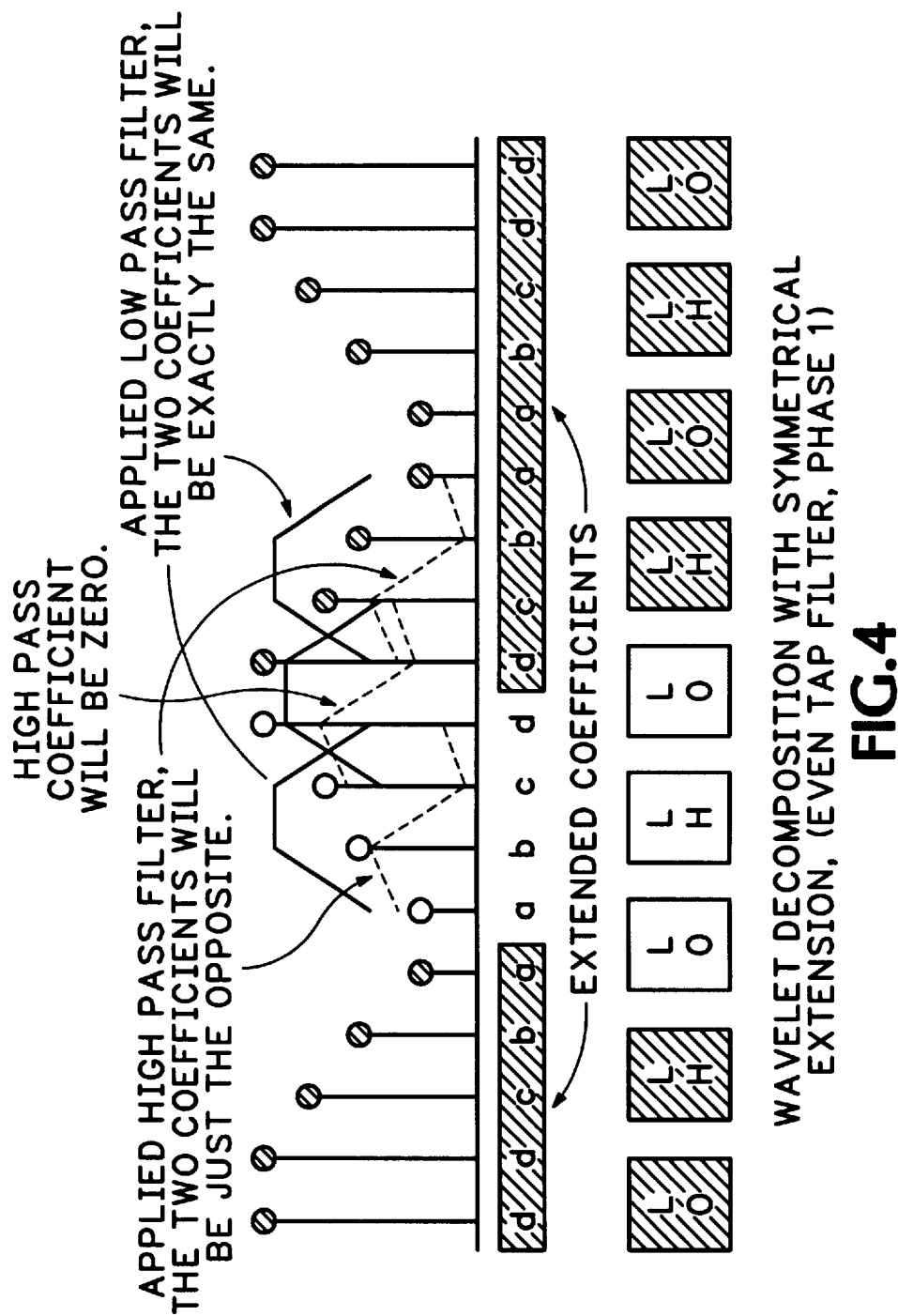
FIG. 4 is a graph showing wavelet decomposition with symmetrical extension for an even tap phase 1 filter.

For an even tap filter, the center of the low and high pass filters are co-located at the same position, i.e., a half index past the even index 2i+0.5 or a half index before the even index 2i−0.5, as shown in FIG. 3 and FIG. 4. Equation (1) to (4) still can be used for even tap filtering, if the representations of the low and high pass filter are adjusted accordingly. For example, the standard Haar filter using equation (1) to (4) will be:

$$\begin{cases} \text{low pass filter: } l_f(-1) = \sqrt{2}/2, l_f(0) = \sqrt{2}/2, 0 \text{ otherwise} \\ \text{high pass filter: } h_f(0) = -\sqrt{2}/2, h_f(1) = \sqrt{2}/2, 0 \text{ otherwise} \end{cases} \quad (5)$$

Periodic Signal Extension.

For wavelet decomposition of a finite even length signal x(n), n=0,1, ..., 2N−1, periodic signal extension may be used. The signal is extended to a period 2N signal $\tilde{x}(n)$ of:

$$\tilde{x}(n) = \sum_j x(n - 2Nj) \quad (6)$$

which is then decomposed by equation 1. It can be proven that the decomposed signal $\tilde{y}(n)$ will also be periodic with period 2N. Therefore, just one period needs to be stored which includes N low pass and N high pass coefficients f(n) and g(n), respectively.

For reconstruction, f(n) and g(i) are combined and periodically extended to form $\tilde{y}(n)$, which is used to reconstruct $\tilde{x}(n)$ of period 2N. The original signal x(n) is reconstructed by taking one period of $\tilde{x}(n)$. Although periodic signal extension is straightforward to implement, it has several limitations. Periodic signal extension can only handle signals of even length. Whenever the two ends of signal x(0) and x(2N−1) are not equal, $\tilde{x}(n)$ is discontinuous at the period boundary, reducing compression efficiency of the wavelet decomposition and causing additional ringing artifacts when $\tilde{x}(n)$ is compressed.

Symmetrical Signal Extension

If the wavelet filters $l_f$, $h_f$, $l_i$ and $h_i$ are linear phase (symmetrical) filters, symmetrical signal extension can be used to avoid discontinuity at the image boundaries and achieve the exact number of wavelet coefficients as the space domain signal. Since almost all practical filters used in wavelet transforms are of linear phase, the symmetrical signal extension is widely adopted. There are two modes of symmetrical signal extension, one for odd tap symmetrical filters, and the other for even tap symmetrical filters.

Symmetrical Signal Extension with Odd Tap Filter

For odd tap linear phase filters, both low and high pass filters are symmetric against the central position. They are also centered at alternate odd and even indexes, as shown in FIGS. 1 and 2. A given signal is defined as x(n), n=0,1, . . . ,N−1 of length N. The signal is first symmetrically mirrored to form signal x'(n) of length 2N−2:

$$x'(n) = \begin{cases} x(n) & n = 0, 1, \ldots, N-1 \\ x(2N-2-n) & n = N, \ldots, 2N-3 \end{cases} \quad (7)$$

Then, x'(n) is periodically extended to form signal $\tilde{x}(n)$ with period 2N−2.

$$\tilde{x}(n) = \sum_j x[n - (2N-2)j] \quad (8)$$

In the symmetrical extension of the odd tap filter, the two boundary pixels x(0) and x(N−1) do not mirror themselves. The extension is illustrated in FIGS. 1 and 2 where the original data x(n) is represented by empty circles and the extended data is represented by shaded circles. The extension of $\tilde{x}(n)$ is equivalent to mirror x(n) repetitively along two boundary points 0 and N, where the boundary points themselves are excluded in mirroring. When the wavelet decomposition in equation 1 is applied to signal $\tilde{x}(n)$, it can be proven that the decomposed wavelet coefficient $\tilde{y}(n)$ has a period 2N−2, symmetrically mirror structure.

A pair of high pass filter coefficients are shown in FIG. 1. Because of the symmetry of the extended data and the symmetry of the filter, the result of the two filtering operations is exactly the same. The same is true for the low pass filter pair shown in FIG. 2. Therefore, only a length N segment y(n) of $\tilde{y}(n)$ needs to be stored. In reconstruction, y(n) is symmetrically extended to $\tilde{y}(n)$, which is then used to reconstruct $\tilde{x}(n)$ using equation ((2). The wavelet decomposition can start with either low or high pass decomposition. This is denoted as phase 0 filtering and phase 1, respectively. In either case, only N samples of decomposition results need to be stored.

Symmetrical Signal Extension with Even Tap Filter

The symmetrical extension for an even tap filter is slightly different from that of the odd tap case. This is because for even tap linear phase filters, the low pass filter is symmetric, but the high pass filter is anti-symmetric. The center of the low and high pass filter is also co-located at the same position, at a half index past the even index 2i+0.5(phase 0), as shown in FIG. 3, or at a half index before the even index 2i−0.5 (phase 1), as shown in FIG. 4. Suppose the original signal is still x(n), n=0,1, . . . ,N−1 of length N. During extension, the signal is symmetrically mirrored to form a periodic signal x'(n) of length 2N:

$$x'(n) = \begin{cases} x(n) & n = 0, 1, \ldots, N-1 \\ x(2N-1-n) & n = N, \ldots, 2N-1 \end{cases} \quad (9)$$

Then, x'(n) is periodically extended to signal x(n) with period 2N.

$$\tilde{x}(n) = \sum_j x[n - 2Nj] \quad (10)$$

With symmetrical extension using the even tap filter, the two boundary pixels x(0) and x(N−1) mirror themselves as do the rest of the coefficients. The extension is shown in FIGS. 3 and 4 where the original data x(n) is represented by empty circles and the extended data are represented by shade circles. There are again two possible phase modes.

Since $\tilde{x}(n)$ is a periodic 2N signal, it is easy to prove that the wavelet coefficient $\tilde{y}(n)$ is also periodic with period 2N.

As in the odd tap case, the low pass coefficients will still be mirrored across the boundary. However, the high pass coefficients will be negatively mirrored, because the high pass filter is anti-symmetric. If the center of the filter coincides with the boundary, as shown in FIG. 4, the high pass coefficient at the boundary will be 0 due to the anti-symmetric nature of the high pass filter. There are still only N independent coefficients y(n) in $\tilde{y}(n)$ that need to be stored. Depending on the phase of the filter and the length of the data, there may be 0, 1 or 2 more coefficients in the low pass band than in the high pass band. In reconstruction, y(n) can be extended to form $\tilde{y}(n)$ with the extension rule of symmetrically mirroring low pass coefficients, anti-symmetrically mirroring high pass coefficients, and filling the high pass coefficients at the center of the boundary with 0. $\tilde{y}(n)$ is then used to reconstruct $\tilde{x}(n)$ through equation 2. One period of $\tilde{x}(n)$ is the original signal x(n).

Arbitrary shape wavelet transform with phase alignment (ASWP)

Figure 5:
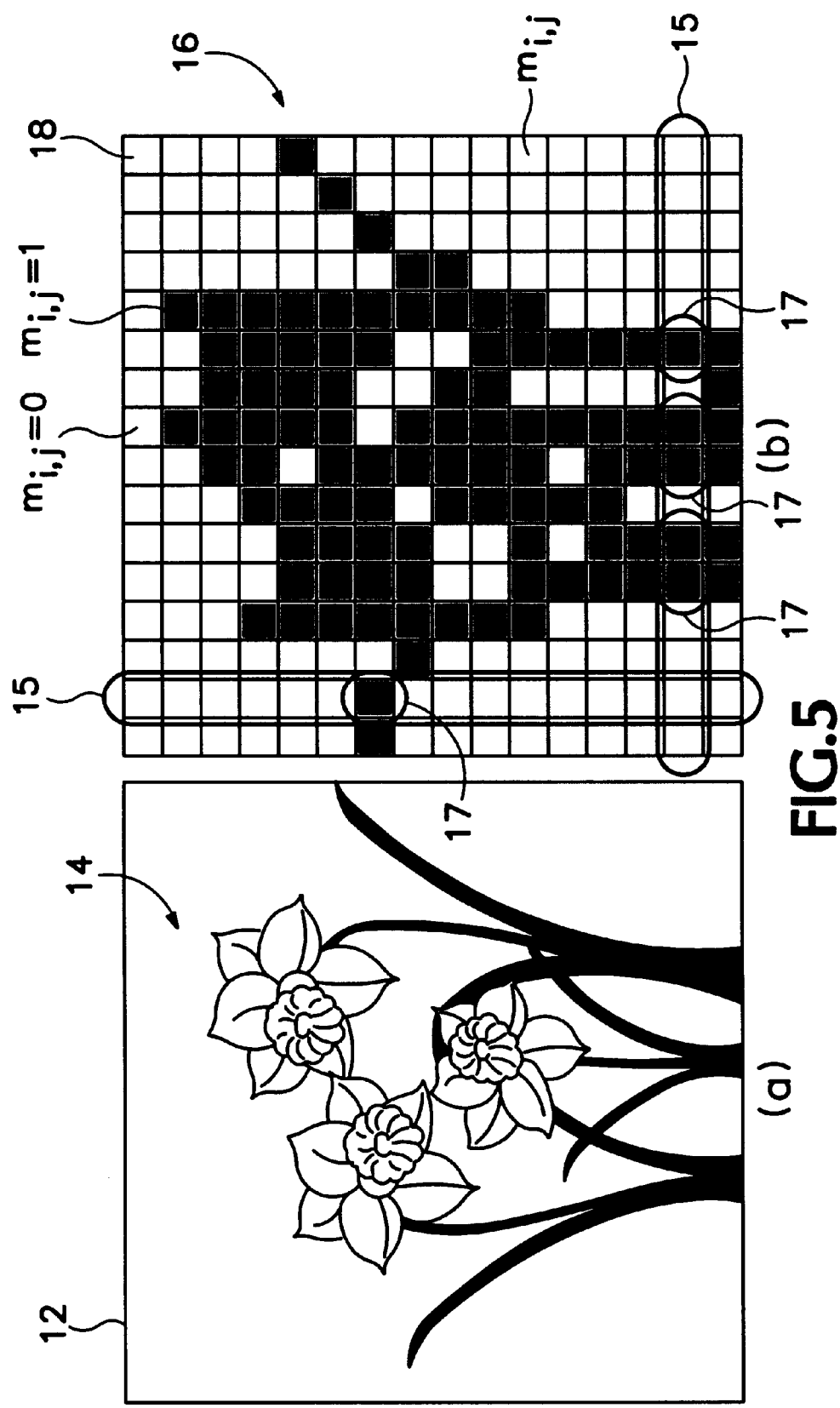
FIG. 5 is a drawing of an image and an associated image map.

Referring to FIG. 5, an 2-D image 12 includes an arbitrary shaped 2-D object 14, such as flowers. A 2-D mask 16 includes cell locations 18 that each coincides with a pixel in the image 14. The 2-D mask 16 and content image 12 in the space domain are denoted by m={mij} and x={xij}, respectively. Assume the mask 16 is binary:

$$m_{i,j} = \begin{cases} 1 & \text{when index } (i, j) \text{ belongs to the object} \\ 0 & \text{when index } (i, j) \text{ does not belong to the object} \end{cases} \quad (11)$$

Mask locations 18 where the index (i,j) belongs to the object 14 are shown as shaded boxes. Mask locations 18 where the index (i,j) does not belong to the object 14 are shown as nonshaded boxes. If the mask 16 has multiple values, the mask itself can be further separated into the binary mask and a content value. 2-D ASWP is performed by first 1-D ASWP horizontal transform each row of the image, and then 1-D ASWP vertical transform each column. An alternative order first performs a 1-D ASWP vertical transform for each column and then a 1 -D ASWP horizontal transform for each row. We define a row or a column of the 2-D image as a segment 15. The segment 15 intersects with the 2-D object 14 and forms several 1-D objects 17.

One-Dimensional ASWP

Figure 6:
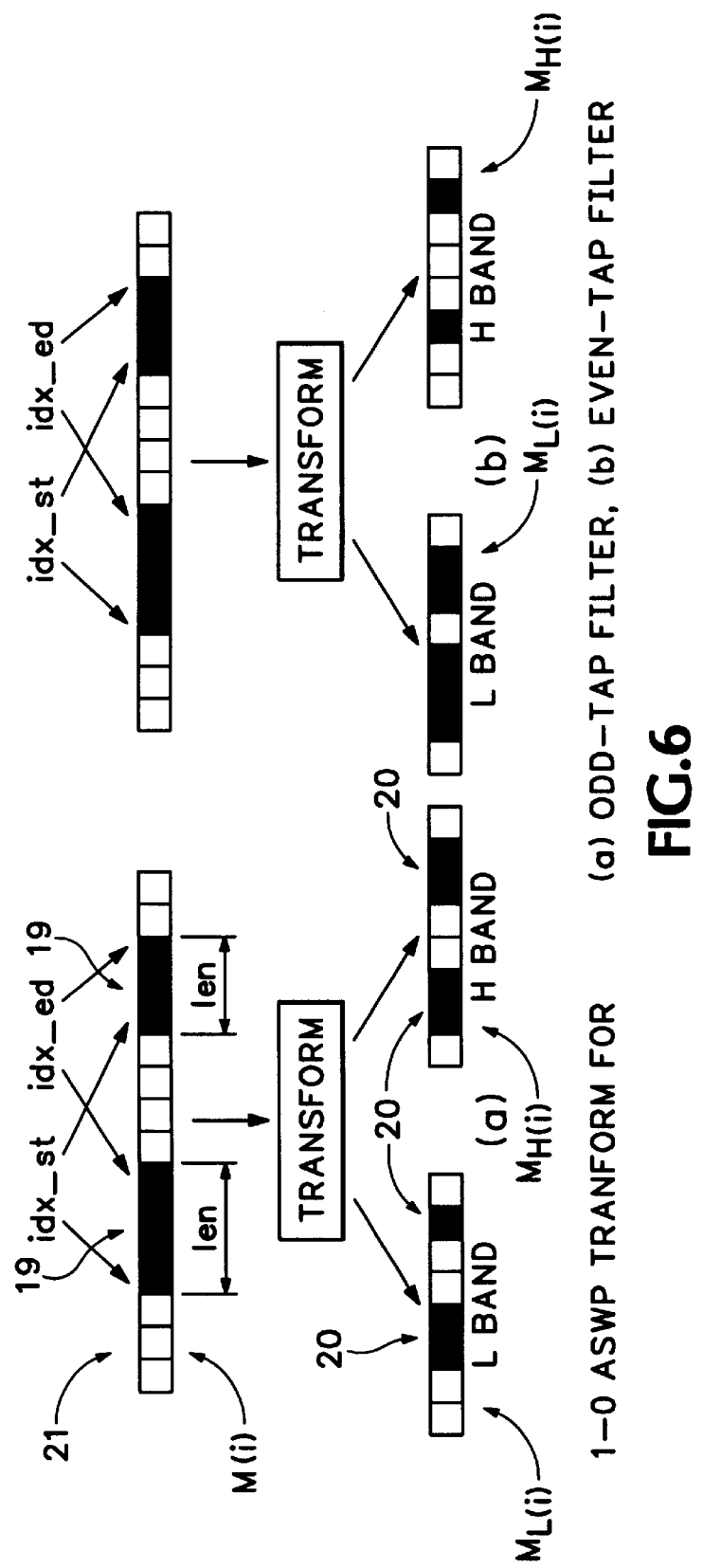
FIG. 6 is a diagram showing a 1-D ASWP transform of the map shown in FIG. 5 for odd-tap and even tap filters.

Referring to FIG. 6, the 1-D ASWP is performed as described below.

1. Object Identification

Since the following discussion is all in 1-D, to prevent confusion, the 1-D mask and 1-D object are simply denoted as mask and object. The mask locates objects 19. The start and end index of each object 19 is denoted by idx_st and idx_ed. The length of the objects 19 are denoted by len= idx_ed-idx_st+1.

2. ASWP Decomposition with Phase Alignment

Each object is independently extended and filtered. The wavelet decomposition rule depends again on whether the tap of the filter is odd or even. For the odd tap filter, the symmetrical extension of odd tap filter is applied. The phase of the filter is fixed with regard to the segment index, i.e., the low pass filter is always applied at even index 2i, and the high pass filter is always applied at odd index 2i+1, with the decomposed wavelet coefficients 20 stored at index i of the low and high pass band, respectively. Depending on the parity of the start index, the object is decomposed with phase 0 filtering (even idx_st) or phase 1 filtering (odd idx_st). The fixed filter phase will be beneficial for the 2D ASWP transform. The decomposition generates the same number of low and high pass coefficients for an even length object, and generates one more low (even idx_st) or high (odd idx_st) pass coefficient for an odd length object.

An alternative implementation always applies the low pass filter at odd index 2i+1, and applies the high pass filter at even index 2i, with the decomposed coefficients stored at index i of the low and high pass band, respectively. In such implementation, the object is decomposed with phase 0 for odd idx_st and phase 1 filtering for even idx_st.

The operation procedure of 1-D even tap ASWP is similar to that of the odd tap case. After the object is identified, each object is extended and filtered independently. The boundary extension and filtering follows the rule of symmetrical extension for the even tap filter. The phase of the filter is again fixed with respect to the original segment index, and in one implementation, the center of the low and high pass filter is always located at index 2i+0.5, i.e., a half index past the even index. The resultant coefficients 20 are stored at index i of the low and high pass band, respectively. Depending on the parity of start index idx_st, the wavelet transform of the object may start with either phase 0 (even idx_st) or phase 1 (odd idx_st). When the start index idx_st or the end index idx_ed is odd, the center of the filter coincides with the object boundary. This results in one more low pass coefficient since the high pass coefficient will be zero at the boundary. Depending on the parity of the start index idx_st and the parity of the object length len, there may be 0, 1, or 2 more low pass coefficients than high pass coefficients.

An alternative implementation of 1-D ASWP with an even tap filter is to fix the center of the low and high pass filter at index 2i−0.5. The decomposed coefficients are still stored at index i of the low and high pass band, respectively. In such a case, depending on the parity of start index idx_st, the wavelet transform of the object may start with either phase 0 (odd idx_st) or phase 1 (even idx_st).

In any of the above implementations, the number of transformed coefficients 20 will be exactly the same as the length of the corresponding objects 19.

Figure 7:
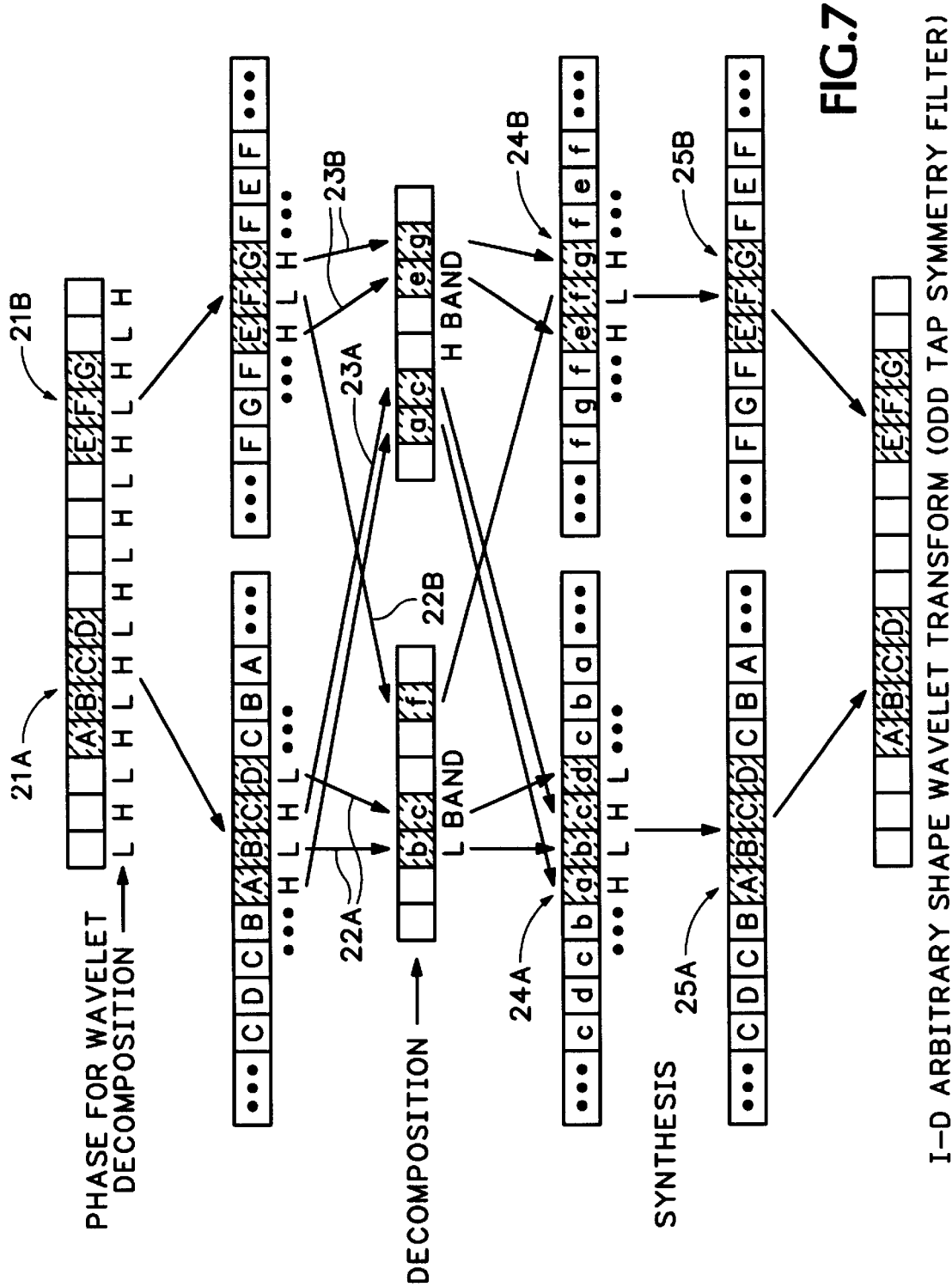
FIG. 7 is a diagram showing a 1-D arbitrary shape wavelet transform for an odd tap symmetry filter.
Figure 8:
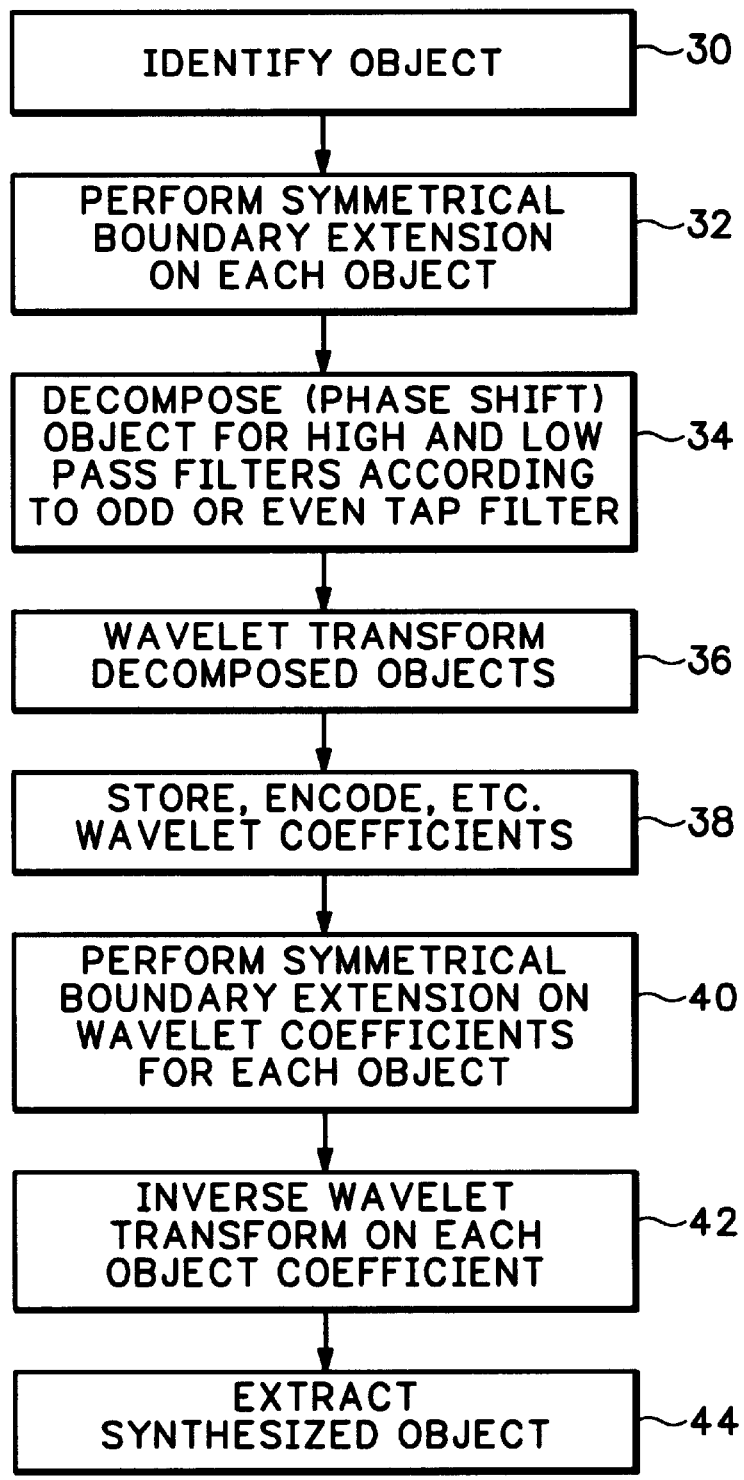
FIG. 8 is a flow diagram describing the arbitrary shape wavelet transform with phase alignment according to the invention.

Referring to FIGS. 7 and 8, a more detailed example of the ASWP 1-D decomposition with an odd tap filter is shown and described. Two objects 21A and 21B are identified in step 30. The first object 21A starts at odd index i=3 and has a length len=4. The second object 21B starts at odd index i=11 and has length len=3. Symmetrical boundary extension is performed on each object 21A and 21B in step 32 according to whether the filter taps is odd or even.

Object 21A has the data sequence [ABCD]. The object 21A is therefore extended symmetrically for an odd tap filter to not include the boundary pixels "A" and "D". The object 21A is extended as follows . . . CDCB[ABCD]CBA . . . . In this example, since both objects 21A and 21B start with an odd index, they are both decomposed starting with phase 1, i.e., starting with the high pass filter.

Step 34 decomposes the wavelet coefficients from the first object 21A into two low pass coefficients 22A and two high pass coefficients 23A. Step 34 also decomposes the wavelet coefficients from the second object 21B into one low pass coefficient 22B and two high pass coefficients 23B. The transformed coefficients 24A and 24B are stored at index 2-3, 6 of the low pass band and index 1-2, 5-6 of the high pass band. They are further encoded, transmitted, etc. in step 38.

For inverse ASWP, a symmetrical boundary extension is performed on the transformed wavelet coefficients 24A and 24B in step 40. An inverse wavelet transform is then performed on each extended object coefficient in step 42. The synthesized objects 25A and 25B are then extracted from the inverse wavelet transform coefficients in step 44. Both objects 18A and 18B (the original signal) can be precisely reconstructed from the transform coefficient segments 24A and 24B.

Figure 9:
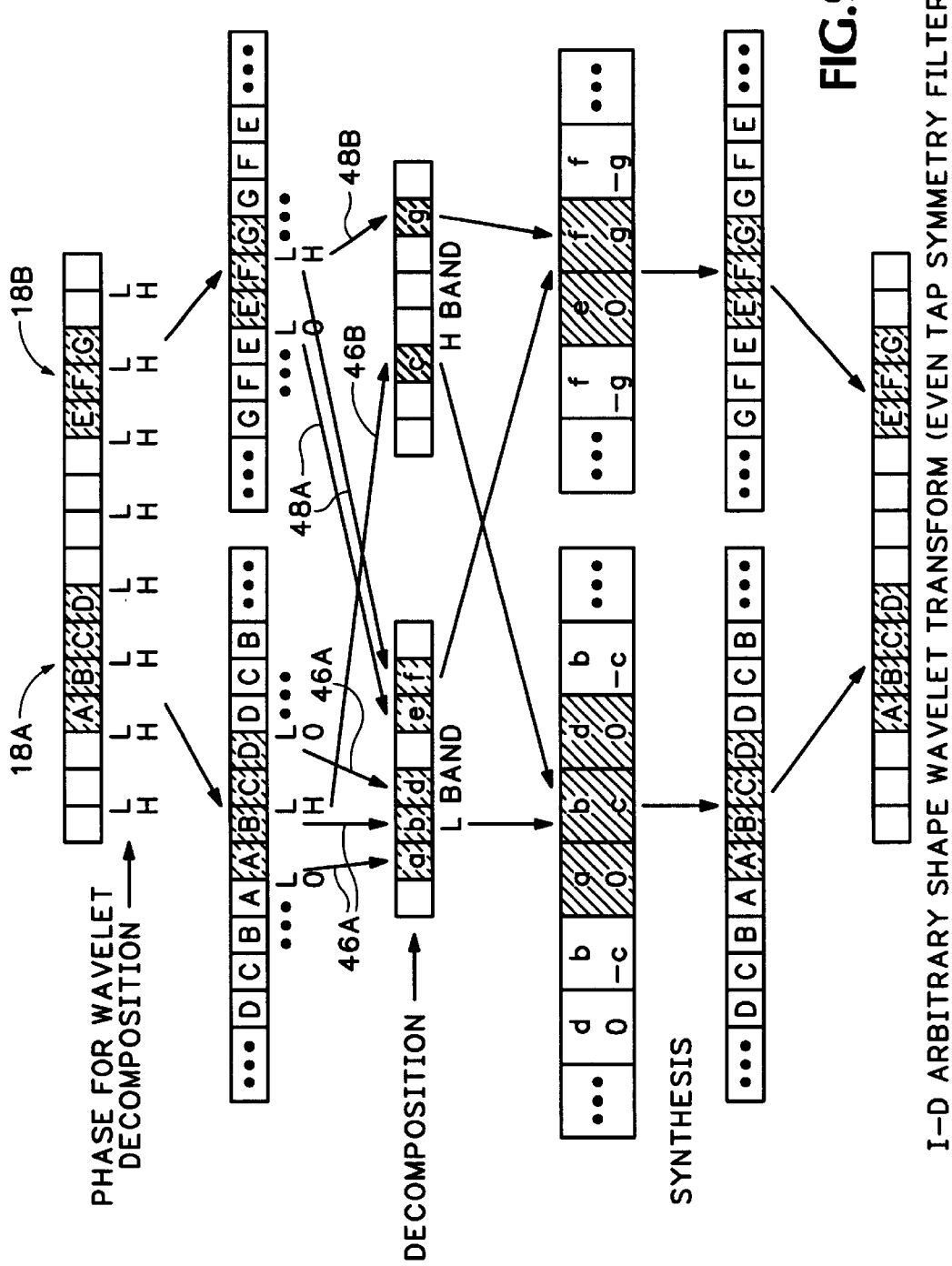
FIG. 9 is a diagram showing a 1-D arbitrary shape wavelet transform for an even tap symmetry filter.

FIG. 9 shows an example of ASWP decomposition for an even tap filter with the same objects 18A and 18B shown in FIG. 7. Since both objects 18A and 18B start with an odd index (i=3, i=11), they are decomposed starting with phase 1 filter, i.e., the center of the low and high pass filter is across the left boundary. The decomposition of the object 18A results in 3 low pass coefficients 46A and only 1 high pass coefficient 46B. The decomposition of the second object 18B results in 2 low pass coefficients 48A and 1 high pass coefficient 48B. The transform coefficients 46A/46B and 48A/48B are stored at index 1-3, 5-6 of the low pass band and index 2 and 6 of the high pass band. Both objects 18A and 18B (the original signal) are perfectly reconstructed from the transform coefficients 46A/46B and 48A/48B, respectively. The number of wavelet coefficients after decomposition is the same as the original objects 18A and 18B in the space domain.

When the length of the object is 1, i.e., a single pixel, special consideration is needed. If the wavelet filter is odd tap, the symmetrical boundary extension is meaningless because the period of extension will be 0. In such a case, the pixel is copied to the low or high pass band, centered at that pixel location. If the wavelet filter is even tap, the pixel is copied to the low pass band.

The masks $m_L(i)$ and $m_H(i)$ identifies the position where the decomposed wavelet coefficients are stored in the low and high pass band, respectively. Referring to FIG. 10, the decomposition rules for the odd length (tap) symmetric filter according to the invention are summarized in table 1 and the decomposition rules for the even length (tap) symmetric filter are summarized in table 2 of FIG. 10.

For the odd tap wavelet filter, the low pass filter is centered at an even index, and the high pass wavelet filter is centered at an odd index, both with regard to the position in the original segment. An object point at an even index will lead to a low pass coefficient, and an object point at an odd index will lead to a high pass coefficient. For the even tap wavelet filter, both the low and high pass filters are centered at index 2i+0.5, or a half index right of the even index. If index 2i+1 happens to be the segment boundary, there will be only one low pass but no high pass coefficient after decomposition. The high pass coefficient is generated only where the object fills both indexes 2i and 2i+1.

For a 2-D ASWP, a horizontal ASWP transform is first performed on each row. A vertical ASWP transform is then performed on each column. Alternative decompositions, i.e., first perform ASWP for each column and then perform ASWP for each row is also feasible. Multi-scale 2-D ASWP is achieved by recursively decomposing the LL subband of each scale. Since the center of low and high pass filters are always fixed with regard to the entire signal, in 2-D ASWP, the vertical transform is applied on horizontal transform coefficients that are already aligned in phase.

Figure 11:
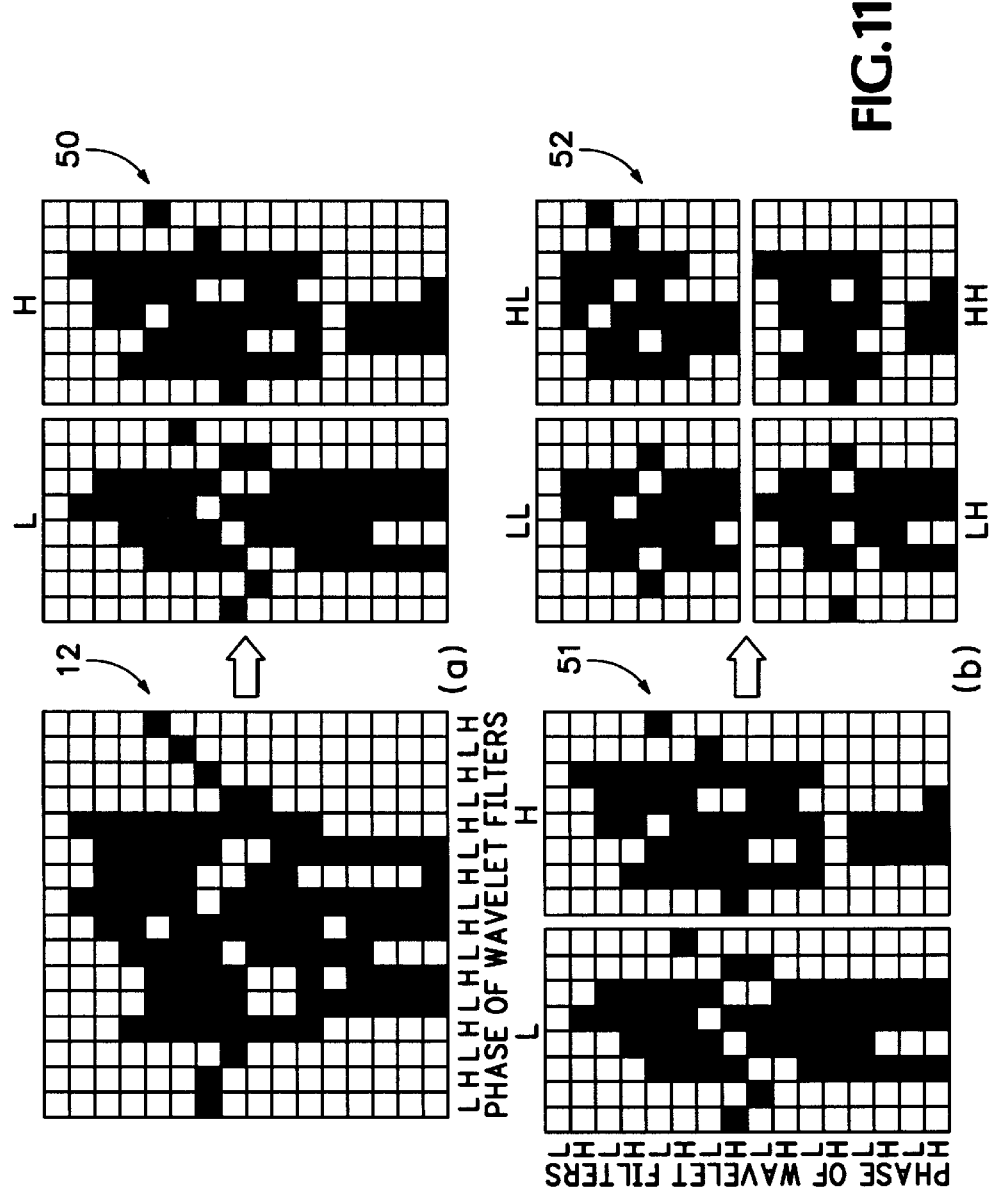
FIG. 11 is a diagram showing a 2-D arbitrary shape wavelet transform using an odd tap filter.

FIG. 11 is an example of a 2D ASWP using an odd tap filter. The original image mask 16 previously shown in FIG. 5 is decomposed with a 1-D horizontal decomposition 50. During the horizontal transform stage 50, the low pass filter L is always centered at the even column indices and the high pass filter H is always centered at the odd column index positions. During the vertical transform stage, the low pass filter is centered at the even row indices and the high pass filter is centered at the odd row indices. The aligned coefficients are then transformed into 4 quadrants 52 by the vertical ASWP. Phase alignment in ASWP improves the subsequent vertical ASWP.

The ASWP is consistent in implementation with the rectangular shape wavelet transform in the texture coding mode of MPEG VM7 or MPEG core experiment ZT1, which also uses the wavelet transform with symmetrical extension. The rectangular shape wavelet transform in the texture mode of MPEG VM7 is a special case of ASWP with the object being the entire rectangular image. No special consideration in implementation is necessary since the symmetrical extension is already adopted by the rectangular shape wavelet transform.

Figure 12:
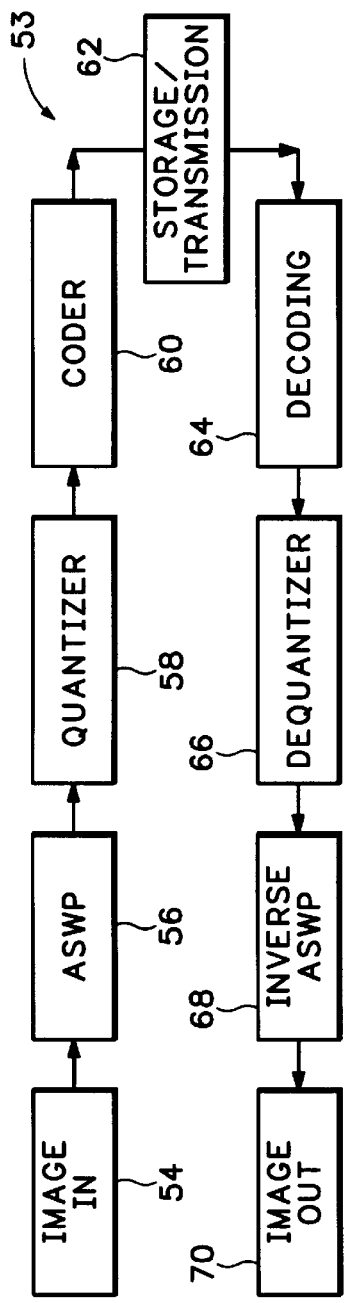
FIG. 12 is a block diagram showing an encoding system incorporating the arbitrary shape wavelet transform with phase alignment according to the invention.

FIG. 12 is a block diagram showing how the ASWP is used in an encoding system 53. An input image 54 is transformed using ASWP in block 56. The ASWP wavelet coefficients are quantized in block 58 and encoded in block 60. The quantized and encoded ASWP coefficients are then either stored or transmitted depending on the application in a storage or transmission medium 62, respectively. To convert the coefficients back into the original image 70, the coefficients are decoded in block 64 and then dequantized in block 66. An inverse ASWP in block 68 converts the wavelet coefficients into an output image 70 that corresponds to the original input image 54.

Figure 13:
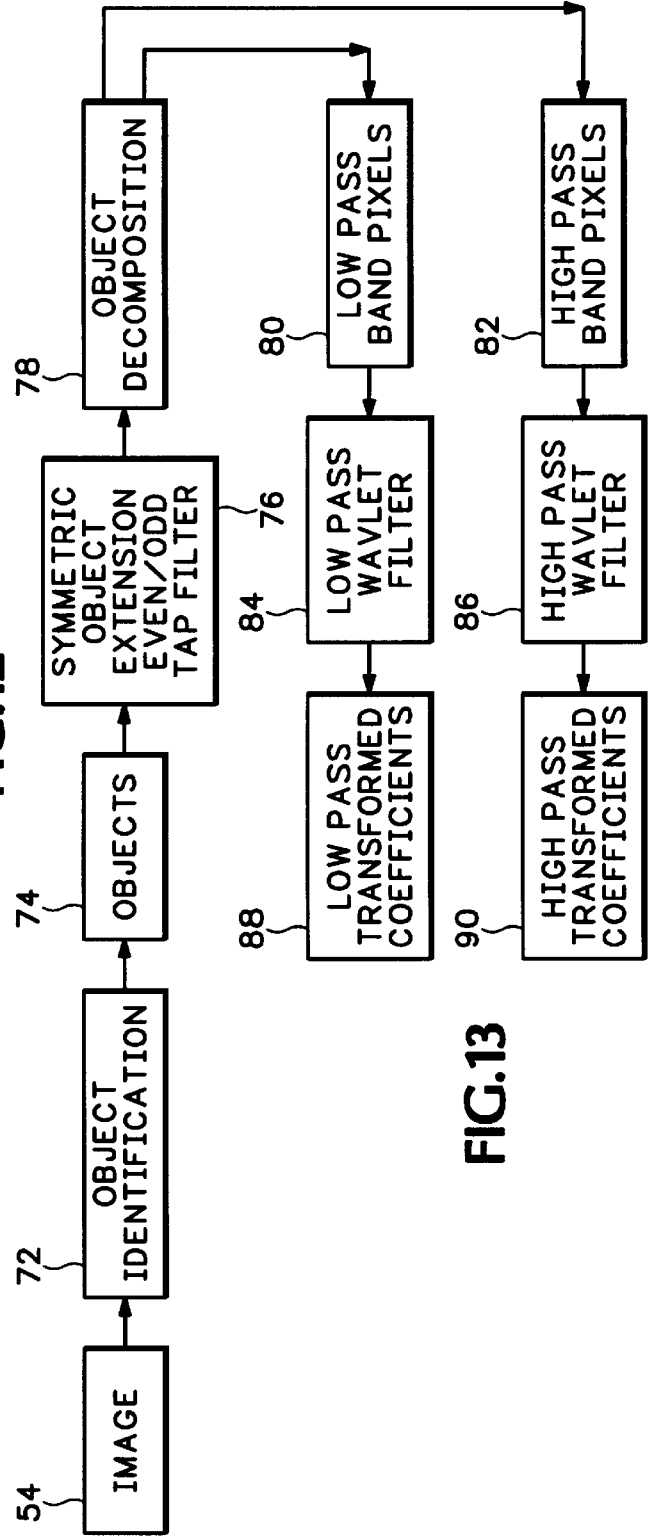
FIG. 13 is a block diagram showing detailed functional blocks used in the arbitrary shape wavelet transform with phase alignment.

FIG. 13 is a detailed block diagram of the ASWP block 56 shown in FIG. 12. The input image 54 is separated into objects 74 in block 72. The objects 74 are symmetrically extended in block 76 with extension rules depending on whether the wavelet transform has an even or odd number of filter taps. The phase of the filter is aligned with regard to the 2-D image. For an odd tap filter, the low pass filter 80 is always centered at an even index, and the high pass filter 82 is always centered at an odd index. For even tap filter, both the low pass filter 80 and high pass filter 82 are centered at a half index past the even index. A low pass wavelet filter 84 transforms the symmetrically extended objects into transform coefficients 88 and a high pass wavelet filter 86 transforms the symmetrically extended objects into transform coefficients 90. The different functional blocks in FIG. 13 can be implemented in software using a general-purpose processor, or, alternatively, the ASWP can be implemented using discrete logic components, in an Application Specific Integrated Circuit (ASIC), or a programmable logic device.

ASWP can be used for applications such as TV animation, special effects, etc. that require objects to be separated from the rest of the image. The objects can then be put back together into the same image or a different image. For example, ASWP can be used to composite images of arbitrary shapes, for generating customized greeting cards. The ASWP can also be used for creating special effects in movies. A picture is taken of an object, such as a person, that needs to be manipulated in a video application. The object is separated from the background image by creating a binary mask that has bits marked only for the pixels in the image representing the object. The ASWP allows the arbitrary shape object to be stored more efficiently.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for 2-D (dimensional) wavelet transforming objects in an image, comprising:

identifying a location of the object in the image;

aligning a phase of a wavelet high pass filter and a wavelet low pass filter in both a vertical and horizontal transform direction with the pixel index locations associated with the image;

symmetrically extending pixel values in individual segments of the object out from edges of the individual segments;

individually wavelet transforming only the symmetrically extended individual segments of the objects in both horizontal and vertical directions into transformed coefficients with the phase aligned low pass wavelet filter and phase aligned high pass wavelet filter while not wavelet transforming the pixel index locations in the image that do not contain part of the object.

2. A method according to claim 1 wherein aligning the phase comprises centering the taps on the low pass filter at even pixel index locations of the image and centering taps on the high pass filter at odd pixel index locations of the image when the low pass filter and the high pass filter have an odd number of taps.

3. A method according to claim 1 wherein aligning the phase comprises centering taps on the low pass filter at odd pixel index locations of the image and centering the taps on the high pass filter at even pixel index locations of the image when the low pass filter and the high pass filter have an odd number of taps.

4. A method according to claim 1 wherein aligning the phase comprises centering taps on both the low pass filter and the high pass filter at one-half of a pixel index location past an even pixel index location in the image when the low pass filter and the high pass filter have an even number of taps.

5. A method according to claim 1 wherein aligning the phase comprises centering taps on both the low pass filter and the high pass filter at one-half of a pixel index location before an even pixel index location in the individual segments when the low pass filter and the high pass filter have an even number of taps.

6. A method according to claim 1 including wavelet transforming the objects that are only one pixel long for the odd tap wavelet high pass and low pass filter by using the pixel as an output of the low pass filter when the low pass filter is centered at the pixel and using the pixel as an output of the high pass filter when the high pass filter is centered at the pixel.

7. A method according to claim 1 including wavelet transforming objects that are only one pixel long for even tap wavelet high pass and low pass filters by using the pixel as an output of the low pass wavelet filter transform.

8. A method according to claim 1 including:

identifying rows and columns in the 2-D object;

horizontal wavelet transforming the 2-D object in each one of the rows with the high and low pass filters aligned with the pixel index locations of the image generating horizontal wavelet coefficients; and vertical wavelet transforming the horizontal wavelet coefficients with the high and low pass filters aligned with pixel index locations of the image.

9. A method according to claim 1 including:

identifying rows and columns in the 2-D object;

vertical wavelet transforming the 2-D object in each one of the columns with the high and low pass filters aligned with pixel index locations of the image generating vertical wavelet coefficients; and horizontal wavelet transforming the vertical wavelet transformed coefficients with the high and low pass filters aligned with pixel index locations of the image.

10. A method according to claim 1 for decoding the transformed coefficients including the following:

symmetrically extending the transformed coefficients when the high pass and low pass wavelet filter each have an odd number of taps by mirroring both the low and high pass transformed coefficients from opposite ends of the transformed object while excluding mirroring the last low and high pass transformed coefficients at the ends of the transformed object;

symmetrically extending the transformed coefficients when the high ass and low pass wavelet filter have an even number of taps by mirroring the low pass transformed coefficients from the opposite ends, anti-symmetrically mirroring the high pass transformed coefficients, and setting high pass transformed coefficients centered at a segment boundary to zero; and inverse wavelet transforming the extended transformed coefficients.

11. A method according to claim 1 including:

quantizing the transformed coefficients of the objects;

encoding the quantized coefficients; and storing or transmitting the encoded coefficients of the objects.

12. A system for wavelet transforming a 2-D arbitrary shaped object in an image, comprising:

an object segmentation stage separating pixels in the image associated with the 2-D arbitrary shaped object;

a horizontal transformer horizontally decomposing the 2-D arbitrary shaped object row by row;

a vertical transformer vertically decomposing the 2-D arbitrary shaped object column by column;

with each horizontal or vertical transformer comprising a symmetric extender stage symmetrically extending pixel values in individual object segments of the 2-D arbitrary shaped object out from edges of the individual object segments according to whether an odd and even tap wavelet filter is being used;

a decomposition stage aligning phase of a high pass and low pass filter for the odd tap wavelet filter at alternate even and odd pixel index locations of the image and aligning phase of the high pass and low pass filter for the even tap wavelet filter at either a pixel index $2i+0.5$ for the image or a pixel index $2i-0.5$ for the image, where i is a pixel index location relative to the image;

a low pass wavelet filter stage transforming the individual object segments aligned with the low pass filter into low pass filter coefficients; and a high pass wavelet filter stage transforming the individual object segments aligned with the high pass filter into high pass filter coefficients.

13. A system according to claim 12 including:

a quantizer stage to quantize the high pass and low pass filter coefficients; and an encoder stage to encode the quantized coefficients.

14. Computer code stored on a computer-readable medium for inverse wavelet transforming wavelet transformed coefficients for a transformed object in an image, comprising:

code to symmetrically extend wavelet transformed coefficients for a high pass and low pass wavelet filter each having an odd number of taps by mirroring both the low and high pass transformed coefficients from opposite ends of the transformed object while excluding mirroring the last low and high pass transformed coefficients at the ends of the transformed object;

code to symmetrically extend the transformed coefficients when the high pass and low pass wavelet filter have an even number of taps by mirroring the low pass transformed coefficients from the opposite ends of the transformed object and anti-symmetrically mirroring the high pass transformed coefficients from opposite ends of the transformed object;

code to align a phase of high pass and low pass odd tap wavelet filters at alternate even and odd pixel index locations in the image and to align high pass and low pass even tap wavelet filters at either a pixel index $2i+0.5$ for the image or a pixel index $2i-0.5$ for the image, where i is a pixel index location of the transformed object relative to the image; and code to inverse wavelet transform the extended transformed coefficients with the aligned high pass and low pass wavelet filters.

15. A method for inverse wavelet transforming wavelet transformed coefficients for a transformed object in an image, comprising:

symmetrically extending wavelet transformed coefficients for a high pass and low pass wavelet filter each having an odd number of taps by mirroring both the low and high pass transformed coefficients from opposite ends of the transformed object while excluding mirroring the last low and high pass transformed coefficients at the ends of the transformed object;

symmetrically extending the transformed coefficients when the high pass and low pass wavelet filter have an even number of taps by mirroring the low pass transformed coefficients from the opposite ends and anti-symmetrically mirroring the high pass transformed coefficients from opposite ends of the transformed object;

aligning a phase of high pass and low pass odd tap wavelet filters at alternate even and odd pixel index locations in the image and aligning a phase of high pass and low pass even tap wavelet filters at either a pixel index $2i+0.5$ for the image or a pixel index $2i-0.5$ for the image, where i is a pixel index location of the transformed object relative to the image; and inverse wavelet transforming the extended transformed coefficients with the aligned high pass and low pass wavelet filters.

* * * * *

UNITED STATES PATENT AND TRADEMARK OFFICE
CERTIFICATE OF CORRECTION

PATENT NO. : 6,233,357 B1  Page 1 of 1
DATED : May 15, 2001
INVENTOR(S) : Jin Li and Shaw-Min Lei It is certified that error appears in the above-identified patent and that said Letters Patent is hereby corrected as shown below:

<u>Column 9,</u>
Line 63, "2-D (dimensional)" should read -- 2-D (two-dimensional) --

<u>Column 11,</u>
Line 9, "high ass and low pass" should read -- high pass and low pass --

Signed and Sealed this

Fourth Day of March, 2003

JAMES E. ROGAN
*Director of the United States Patent and Trademark Office*